US012567443B2

(12) United States Patent
Hong et al.

(10) Patent No.: US 12,567,443 B2
(45) Date of Patent: Mar. 3, 2026

(54) METHOD FOR READING AND WRITING FRAME IMAGES HAVING VARIABLE FRAME RATES AND SYSTEM THEREFOR

(71) Applicant: REALTEK SEMICONDUCTOR CORP., Hsinchu (TW)

(72) Inventors: Shi-Xuan Hong, Hsinchu (TW); Huan-Wen Chen, Hsinchu (TW); Po-Hsien Wu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 50 days.

(21) Appl. No.: 18/444,860

(22) Filed: Feb. 19, 2024

(65) Prior Publication Data

US 2024/0282339 A1     Aug. 22, 2024

(30) Foreign Application Priority Data

Feb. 20, 2023    (TW) .................................. 112106040

(51) Int. Cl.
   *G11B 20/10*         (2006.01)
   *G06T 1/60*          (2006.01)
(52) U.S. Cl.
   CPC .......... *G11B 20/10527* (2013.01); *G06T 1/60* (2013.01); *G11B 2020/1062* (2013.01)
(58) Field of Classification Search
   CPC ...... G11B 20/10527; G11B 2020/1062; G06T 1/60; G09G 5/393; H04N 7/0105
   USPC ............................ 386/326; 345/547; 348/441
   See application file for complete search history.

(56) References Cited

U.S. PATENT DOCUMENTS

| | | | |
|---|---|---|---|
| 9,836,811 B2 * | 12/2017 | Asai ...................... | G09G 3/3611 |
| 2005/0105001 A1 * | 5/2005 | Yui ........................ | G09G 5/397 |
| | | | 348/441 |
| 2015/0249775 A1 * | 9/2015 | Jacumet ................. | H04N 5/772 |
| | | | 348/333.11 |
| 2015/0264298 A1 * | 9/2015 | Colenbrander ........ | G09G 5/001 |
| | | | 345/547 |
| 2016/0078851 A1 * | 3/2016 | Asai ...................... | G09G 5/005 |
| | | | 345/555 |
| 2016/0189685 A1 * | 6/2016 | Ryan ..................... | G09G 5/003 |
| | | | 345/547 |
| 2018/0338112 A1 * | 11/2018 | Yanaba .................. | G09G 5/005 |
| 2020/0184934 A1 * | 6/2020 | Choi ........................ | G09G 5/18 |

FOREIGN PATENT DOCUMENTS

CN          108449566 A      8/2018

* cited by examiner

Primary Examiner — Thai Q Tran
Assistant Examiner — Stephen R Smith
(74) Attorney, Agent, or Firm — Li & Cai Intellectual Property (USA) Office

(57) ABSTRACT

A method for reading and writing frame images having variable frame rates and a system therefor are provided. The system provides a video processing system that includes a write end and a read end for accessing a single buffer block. In the method performed in the video processing system, when the read end starts to read an image frame, the read end is controlled to not read data from the buffer block until the data written by the write end to the buffer block reaches a progress threshold; and when it is determined that a portion of the data in the buffer block not yet read by the read end will be overwritten by the data written by the write end, the writing process is terminated until the read end finishes reading the data in the portion in the buffer block.

16 Claims, 10 Drawing Sheets

METHOD FOR READING AND WRITING FRAME IMAGES HAVING VARIABLE FRAME RATES AND SYSTEM THEREFOR

CROSS-REFERENCE TO RELATED PATENT APPLICATION

This application claims the benefit of priority to Taiwan Patent Application No. 112106040, filed on Feb. 20, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology of frame buffering, and more particularly to a method for reading and writing frame images having variable frame rates by controlling operation of the buffer blocks and a system therefor.

BACKGROUND OF THE DISCLOSURE

Frame rate control (FRC) should be performed based on input video specifications and requirements such as a refresh rate or a frame rate of a display end when an image device or an image processor receives audiovisual data from an audiovisual source. Images can be properly outputted after an input end and an output end of the image device or the image processor are matched. Generally, an input video is frame-by-frame stored to a buffer, and a frame rate conversion for an output frame is performed on the video with a limited size of buffer under a condition of a fixed data rate. When the frame images are accessed in a single buffer block, the frame rate control will be operated under an input fast mode or an input slow mode. The main reason causing the input fast mode and the input slow mode is that a memory access rate of the input end of the image processor does not meet the requirements such as the refresh rate and an image resolution of the output end. The input fast mode indicates that a transmission rate of an input circuit of the image processor is faster than a transmission rate of the output end. On the other hand, the input slow mode indicates that the transmission rate of the input circuit of the image processor is slower than the transmission rate of the output end. Therefore, when the data rate is variable and only one image can be accessed in the single buffer block within a period of time, the image device or the image processor may encounter problems such as a reduced refresh rate or frame tearing that can result in a decrease of video quality.

FIG. 1 is a timing diagram showing a decrease of a refresh rate of a video when a single buffer block is used to access the images. The timing diagram shows a write timing 101 and a read timing 102. The several upward arrows in the timing diagram indicate vertical sync signals that are referred to by the image processor to control progresses of frame-by-frame writing data to the buffer block and reading data from the buffer block. The vertical sync signal is generated when the image processor or a software program completes writing a frame image. Thus, an interval between two adjacent upward arrows indicates a time for writing or reading one frame image.

FIG. 1 depicts a condition under the input slow mode. Since the speed for frame-by-frame writing data to the buffer block is slower than the speed for reading data therefrom, the image device or the image processor may be faced with the problems of frame drop or reduced refresh rate when the read end can only read the data after waiting for the write end to complete writing data to the buffer block.

According to the write timing 101 as shown in FIG. 1, through the control of a system, a circuit of the write end firstly writes a frame A to the buffer block. When the write end reaches a writing progress, according to the read timing 102, the read end reads the frame A from the buffer block. At this time, the system continues to receive images. In the meantime, the write end can go on to write data only after waiting for the read end to completely read the frame A. However, via the single buffer block, when the read end completely reads the frame A, the write end may not write a next frame B but writes a next frame C instead. Similarly, the read end can continue to read the frame C when the write end reaches a writing progress. Further, if the buffer block is occupied by the read end, the write end cannot continue to write a frame D until the read end completely reads the frame C, and the write end can only write a next frame E. When the read end reads the frame E, the write end may not write a frame F. Therefore, when the system operates under the input slow mode with the single buffer block, it is possible to output only one frame if two frame images are inputted, such that the conventional system has the problem of frame drop so that an overall refresh rate is reduced.

Under the input slow mode, when one frame image is written to the single buffer block at the write end, as shown in FIG. 2, the write end does not wait for the read end to completely read the frame image before writing a next frame image. In FIG. 2, as shown by a write timing 201, the write end continuously writes the frame images, and as shown by a read timing 202, the read end waits for the write end to write the frame images and starts to read the frame images from the buffer block when the write end reaches a certain progress.

Under the input slow mode, as shown in FIG. 2, when the write end writes a frame A and reaches a writing progress, the read end reads the frame A from the buffer block. The write end goes on writing a next frame B if the frame A is completely written. The read end goes on reading the frame B that is written to the buffer block when the read end reads the frame A completely. After the write end completely writes the frame B, the write end writes a frame C; as shown in the present example, since the read end has a faster read rate, the read end may read the frame C that the write end does not write to the buffer block completely. Under the input slow mode, it is possible that the read end can read a previous frame image that is not overwritten, i.e., a segment of the frame B following after the frame C in the read timing 202, after completely reading the frame C that is written to the buffer block. In this situation, the output frame image may include contents of both the frame C and the frame B, such that a frame tearing (i.e., a location 203 of a frame tearing) may visibly occur as shown in the diagram.

Under the input slow mode, as shown in FIG. 2, the frame tearing may still occur in the subsequent images. For example, according to the diagram, when a frame F is read, due to the read rate being faster, the read end may read a portion of the previous frame E that is not yet overwritten by the write end. Therefore, the frame tearing such as the location 204 of FIG. 2 occurs since the frame image to be outputted may include contents of both the frame E and the frame F.

FIG. 3 is a timing diagram that illustrates frame-by-frame storing the frame images to the single buffer block under the input fast mode. A write timing 301 shows that the write end has a faster write rate, and a read timing 302 shows that the read end has a slower read rate. According to the timing diagram, the write end consecutively writes the frames A, B, C, D, E, F, G, and H to a single buffer block. The read end having the slower read rate firstly reads the frame A from the single buffer block. When the read end reads the frame B, the write end writes the frame B in time. Afterwards, when the read end starts to read the frame C, because the write end has the faster write rate, the write end instantly writes the further frame D to the buffer block after finishing writing of the frame C. However, when the read end is to read a second half of the frame C, the read end reads the frame D data that is just written by the write end. Therefore, the frame tearing is formed at the location 303 of the diagram. Similarly, according to the read timing 302, when the read end reads the frame G, the write end already starts to write the frame H, and the read end may read the frame H from the buffer block when reading a second half of the frame G. Therefore, the frame tearing is formed at the location 304 of the diagram.

In addition to the problem caused by writing and reading the single buffer block, the frame tearing may still be formed in the image-processing system having multiple buffer blocks. In the image-processing system, if there is a need to repeatedly read the frame images, such as using two frames to transmit information of luminosity and brightness respectively under a specific coding format, a frame tearing may still be formed.

FIG. 4 is a timing diagram showing that the frame images are repeatedly read from multiple buffer blocks according to a conventional technology.

In the timing diagram, the frame images are read from two buffer blocks (block 0 and block 1). A write timing 401 denotes that the frames A, B, C, D, E, F, and G are alternately written to the buffer block 1 and the buffer block 0. When it is required to read a same frame repeatedly, such as that shown in a read timing 402, the frame image in the buffer blocks may be read twice by repeatedly reading data from the buffer blocks. If the read end reads the frame image being updated by the write end, the frame tearing phenomena (the locations 403, 404, and 405) may also be formed as the mentioned frame tearing presented in the single buffer block.

Therefore, if the input rate and the output rate are not fixed values, a refresh rate of a system may be varied and the conventional manner of frame rate control may cause poor viewing experience for users due to having a decreased refresh rate and frame tears.

SUMMARY OF THE DISCLOSURE

When an image-processing circuit or software program is used to process an input video, a frame rate control process may cause problems such as a decrease in refresh rate and the formation of frame tearing due to a variable data rates. In response to the above-referenced technical inadequacies, the present disclosure provides a method and a system for reading and writing frame images having variable frame rates. The method addresses the abovementioned problems by controlling the timing for a write end and a read to access a buffer block.

The system that performs the method for reading and writing frame images having variable frame rates provides a video-processing system that includes a write end and a read end that are configured to access one or more buffer blocks. The video-processing system uses circuits and software to achieve the write end and the read end that are respectively connected with a memory that implements a single buffer block.

Furthermore, the video-processing system includes a frame rate controller that is used to control each of the frame images of a video to be written to the single buffer block, read from the single buffer block and frame rate conversion.

In the method for reading and writing frame images having variable frame rates, when the read end starts is configured to read the frame images in the buffer block, the read end is controlled to start reading the frame images from the buffer block if data written by the write end to the buffer block reaches a progress threshold. Furthermore, when an unread portion of the read end is determined to be overwritten by the data written by the write end, a writing action of the write end will be terminated until the read end finishes reading the frame images in the buffer block.

Further, in the method for reading and writing frame images having variable frame rates, when the write end writes the frame images to the buffer block, a control circuit or control software in the video-processing system determines a writing progress of the write end writing the frame images to the buffer block. If the writing progress of the write end reaches the progress threshold, the read end is notified to start reading the frame images in the buffer block.

In one embodiment of the present disclosure, a buffer-reading clock is introduced, and when the write progress of the write end does not reach the progress threshold, the read end relies on the buffer-reading clock to modify an original vertical sync signal of the read end so as to suspend a reading action of the read end.

For the video-processing system, if a control circuit or control software in the video-processing system determines that the buffer block to be written with a new frame image by the write end stores unread data of the read end, the write end is controlled to terminate writing the frame images.

In one further embodiment of the present disclosure, a write-mask clock is introduced, and when the read end is yet to finish reading the frame images from the buffer block, the write-mask clock is applied for terminating the writing action of the write end.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
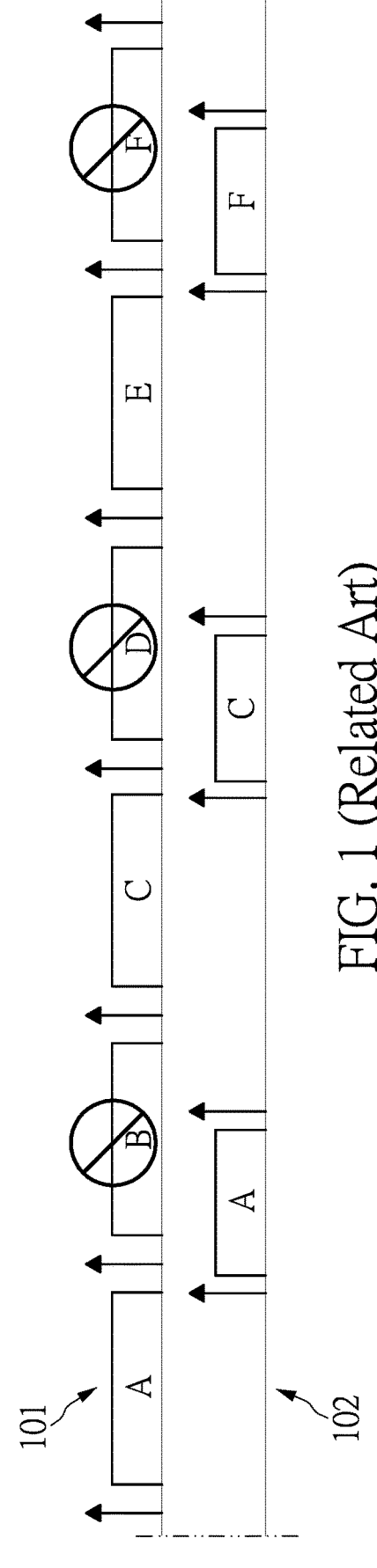
FIG. 1 is a timing diagram of frame-by-frame storing frame images to a single buffer block under an input slow mode according to a conventional technology.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

For an audiovisual data having a variable refresh rate (VRR) and being provided by a specific audiovisual source, a frame rate control (FRC) should be performed by an image-processing circuit or software of an audiovisual device. The frame rate control is configured to process the input video so that the input video matches with an output requirement. However, if a data rate of the audiovisual device is not fixed, or a buffer space is for accessing only one image, i.e., the buffer space is a single buffer block, an output video may have problems such as a decreased refresh rate or frame tearing. The quality of the output video is affected. In the present disclosure, a method for reading and writing frame images having variable frame rates and a system are provided, in the method and the system, the problem that the image quality becomes degraded due to a variable data rate in the conventional technology can be solved by controlling a time to access the buffer block and operation of the buffer.

Figure 5:
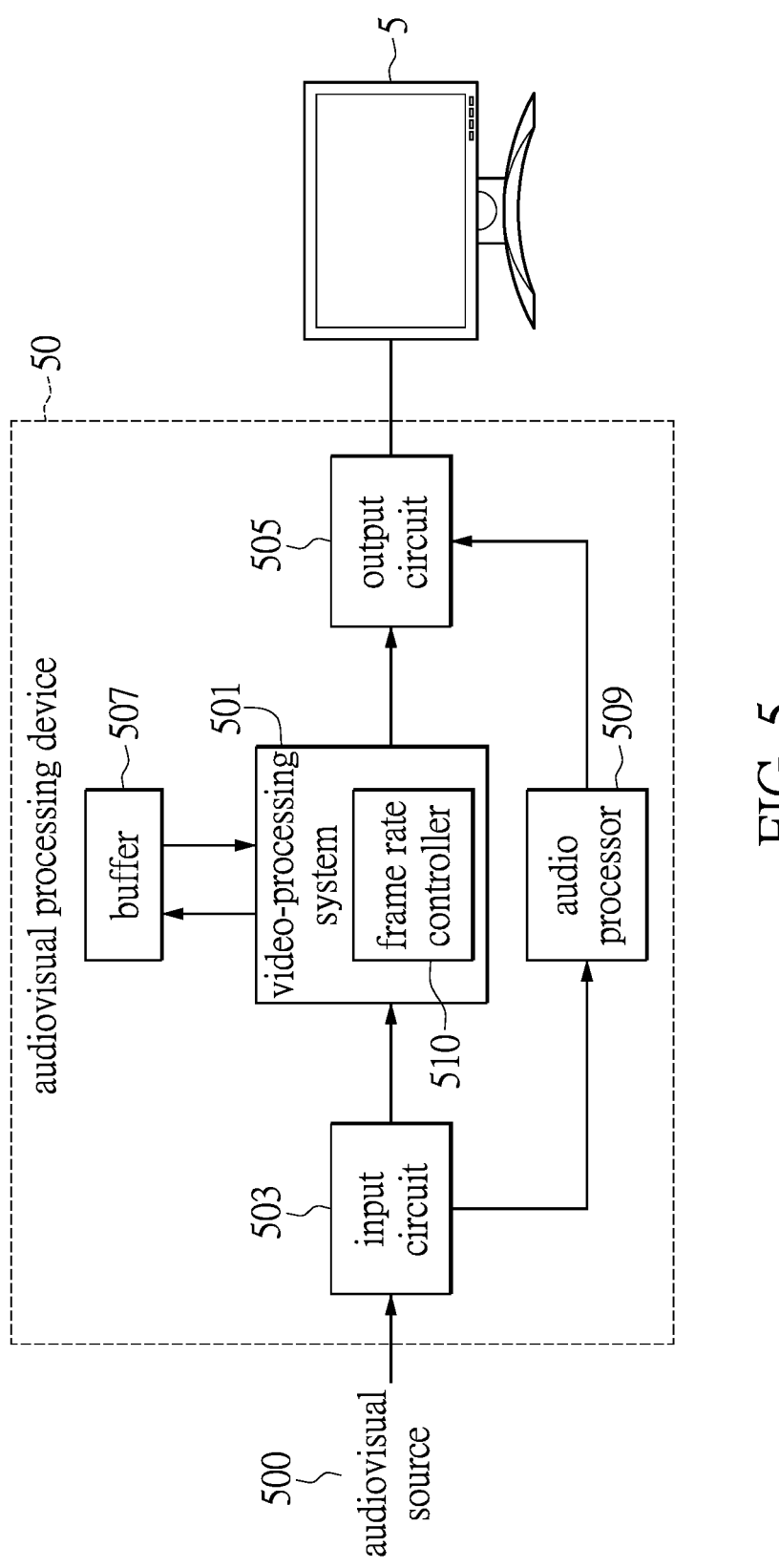
FIG. 5 is a schematic diagram of a system that executes a method for reading and writing frame images having variable frame rates according to one embodiment of the present disclosure.

Reference is made to FIG. 5, which is a schematic diagram depicting the system that implements a video-processing system by a system-on-chip (SoC) or software. According to one embodiment of the present disclosure, the system controls operations of the write end and the read end, and can be applied to a device having a single buffer block.

As shown in FIG. 5, the system includes an audiovisual processing device 50 that receives an audiovisual data from an audiovisual source 500. The audiovisual processing device 50 includes circuits that respectively process a video and an audio. The system includes a video-processing system 501 and an audio processor 509. The video-processing system 501 performs the method for reading and writing frame images having variable frame rates, and the audio processor 509 is used to process the audio signals. The video-processing system 501 includes a frame rate controller (FRC) 510 and controls operations of writing each of the frame images of a video to a buffer 507 and reading the frame images, and performs frame rate conversion by using a control circuit or control software. In practice, the video-processing system 501 can be an image-processing card, a set-top box or an SoC that performs the method for reading and writing frame images having variable frame rates.

The audiovisual processing device 50 includes an input circuit 503 and an output circuit 505. The audiovisual processing device 50 receives the audiovisual data from the audiovisual source 500 via the input circuit 503. A video portion of the audiovisual data is provided to the video-processing system 501, and an audio portion of the audiovisual data is provided to the audio processor 509. After the audiovisual data is completely processed, the audiovisual data that is processed is outputted to an audiovisual terminal 5 via the output circuit 505.

The video-processing system 501 of the audiovisual processing device 50 uses circuits or software to implement a write end for performing writing function and a read end for performing reading function. Both the write end and the read end are electrically connected with a buffer 507 that is implemented by a memory inside the audiovisual processing device 50 or by an external storage. The buffer 507 can be configured to have one or more buffer blocks.

One of the objectives of the method of the present disclosure is to solve the problem such as decreased refresh rate or frame tearing when accessing the single buffer block with a variable frame rate. The video-processing system 501 performs accessing the frame images from the single buffer block by using the frame rate controller 510. The frame rate controller 510 is used to match the specification of the input video with the requirement (e.g., the refresh rate) of the output circuit. When accessing the frame images from the single buffer block, the frame rate control for accessing the single buffer block can be categorized into an input fast mode and an input slow mode. Under the input fast mode, the write end needs to wait for a reading progress of the read end. The write end selects the buffer block to be written according to a buffer block index of the read end that acts as a master of the input fast mode. Under the input slow mode, the read end selects the buffer block to be read according to a buffer block index of the write end that acts as a master of the input slow mode. The buffer block index can be stored to a specific memory of the system by a manner of software or hardware that is such as a DDR or SRAM. The buffer block index can be used as a reference for determining a progress for accessing the buffer 507 by the write end or the read end.

The system is used to perform the method for reading and writing frame images having variable frame rates. The method solves the problems caused by variable data rate of the system by controlling operations of the write end and the read end of the buffer block of the system. The buffer block is particularly a single buffer block. For solving the problems of decreased refresh rate and the frame tearing caused by the conventional methods of FIG. 1 through FIG. 4, two methods for controlling the operating mode of the write end and the read end are provided as follows.

It should be noted that, in the video-processing system, the write end and the read end of the buffer block are controlled by means of hardware or software. For solving the problem caused by the variable frame rate in the system with the single buffer block, the method for reading and writing frame images having variable frame rates is provided and is referred to as in the timing diagrams shown in FIGS. 6 to 10. A main concept of the method is that, when the read end starts to read a frame image from the buffer block, the read end is controlled to wait until the progress of the write end that writes data to the buffer block reaches a progress threshold and/or, when an unread portion of the read end is determined to be overwritten by the write end, a writing action of the write end is terminated.

Under a first control mode, it is stipulated that the read end is notified for reading the data from the buffer block when the writing progress of the write end writing the data to the buffer block reaches the progress threshold, so that reading no data or reading the buffer block without updated data can be avoided. Under a second control mode, a control circuit or control software of the system obtains a location of writing data to the buffer block or reading data from the buffer block, thereby determining whether or not to terminate the action of the write end, so that the unread data in the buffer block will not be overwritten.

For example, under the first control mode, the control circuit or the control software of the video-processing system determines the writing progress of the write end writing the data to the buffer block. When the writing progress of the write end writing the data to the buffer block reaches a preset progress threshold, the control circuit or the control software notifies the read end to start reading the data from the buffer block. Thus, reading the location of the buffer block where a new data is not yet written can be avoided.

In an exemplary example under the second control mode, the timing at which the write end writes a frame image (e.g., a frame image E) to the buffer block is later than the timing at which the read end reads a previous frame (e.g., a frame image D). However, since the write end has a faster write rate, the unread data in the buffer block may be overwritten if the write end continuously writes the data to the single buffer block. Therefore, if it is determined that the location of the buffer block to be written with a new data (e.g., a new frame image) has stored the data that is not yet read by the read end, the write end is controlled to terminate writing the new data to the location of the buffer block. Otherwise, if it is determined that the read end finishes reading the data from the location of the buffer block that is configured to be written with the new data, the write end starts to write the new data to the location of the buffer block.

Figure 6:
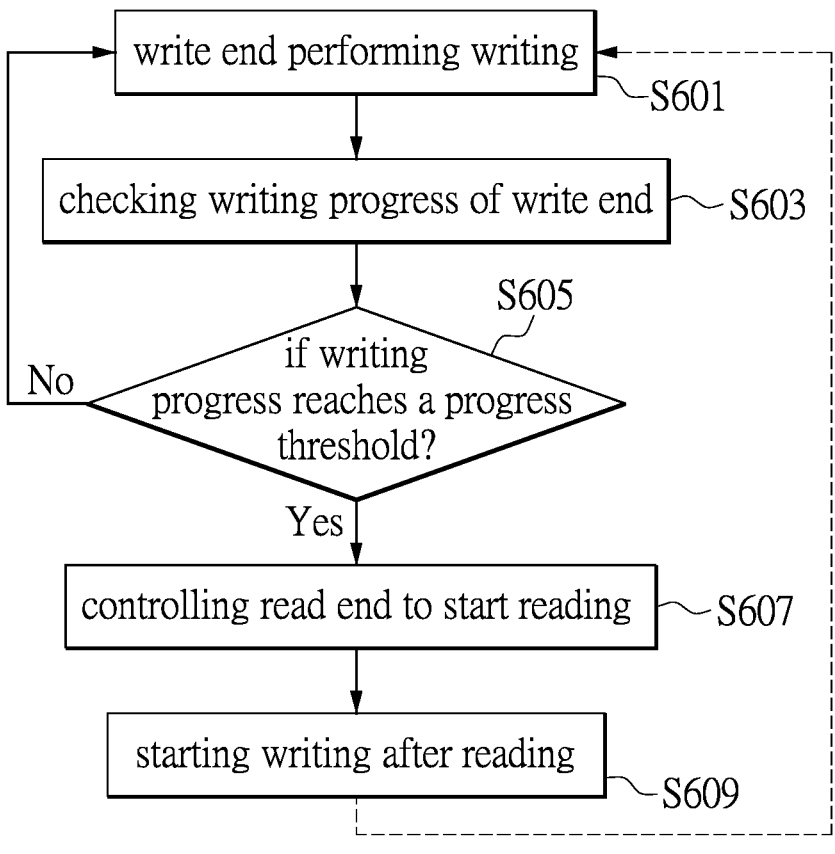
FIG. 6 is a flowchart of the method for reading and writing frame images having variable frame rates according to a first embodiment of the present disclosure.

The operation of the first control mode refers to a process as described in FIG. 6, which is a flowchart of the method for reading and writing frame images having variable frame rates according to a first embodiment of the present disclosure.

Under the first control mode, the write end is controlled to perform a writing action by a control circuit or software of the video-processing system (step S601). Based on the requirement of matching the video formats of an input end and an output end through frame rate control (FRC), the write end is controlled to frame-by-frame write the frames to a buffer block, and vertical sync signals generated by the write end can be used to check a writing progress of the write end writing the data to the buffer block (step S603). In the meantime, it is determined whether or not the writing progress reaches a progress threshold (step S605).

When the writing progress of the write end is yet to reach the progress threshold that is set by the system (determined as "no"), the process goes back to step S601 for continuing to write the frame images to the buffer block. If it is determined that the writing progress of the write end reaches the progress threshold (determined as "yes"), the read end is controlled to start to read the data from the buffer block (step S607). After the read end finishes reading the frame images from the buffer block, the write end is controlled to write a next frame image (step S609), and the aforementioned steps are repeated.

Figure 7:
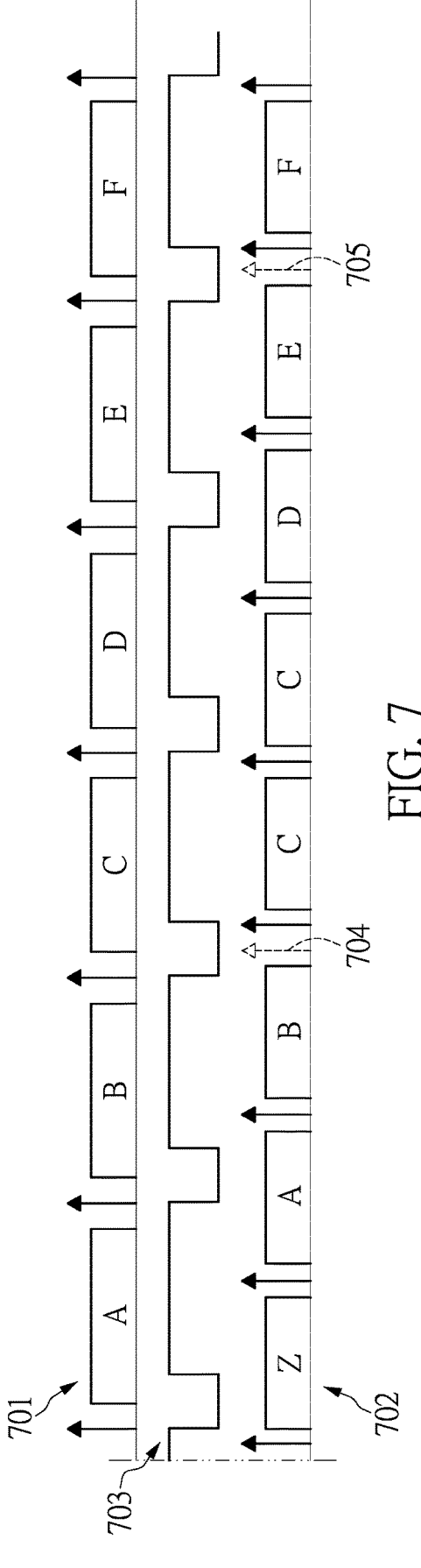
FIG. 7 is a timing diagram introducing a buffer-reading clock used in the method for reading and writing frame images having variable frame rates according to one embodiment of the present disclosure.

Corresponding to the exemplary flow shown in FIG. 6, reference is made to FIG. 7, which is a timing diagram of using a buffer-reading clock in the method for reading and writing frame images having variable frame rates according to one embodiment of the present disclosure.

Figure 2:
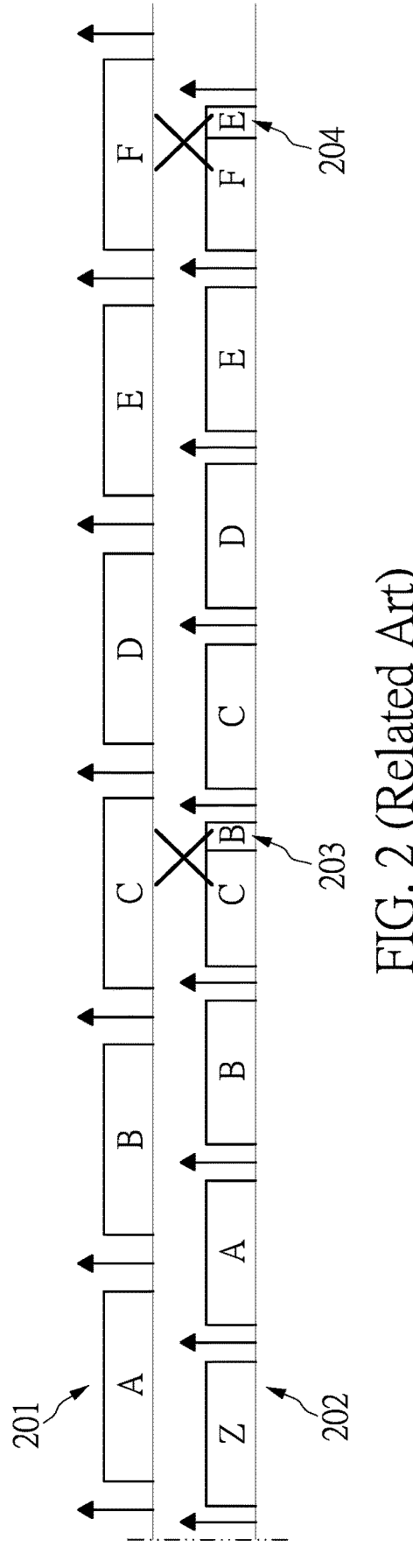
FIG. 2 is another timing diagram of frame-by-frame storing frame images to the single buffer block under the input slow mode according to another conventional technology.
Figure 3:
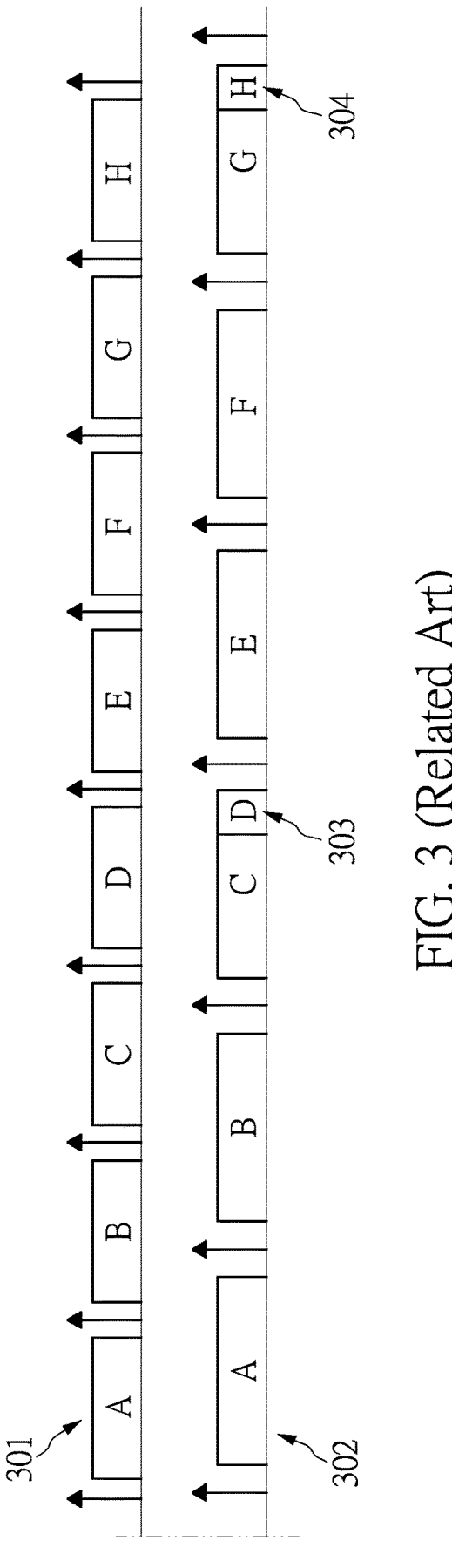
FIG. 3 is a timing diagram of frame-by-frame storing frame images to the single buffer block according to a conventional technology.
Figure 4:
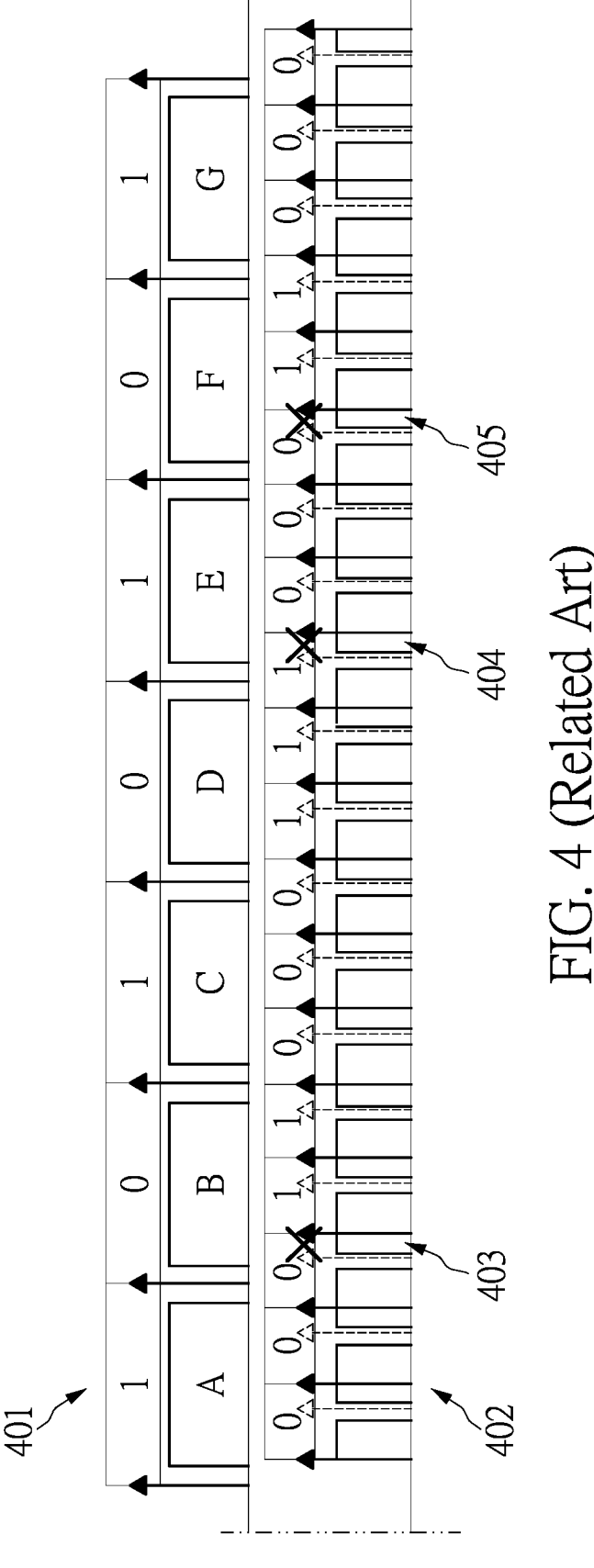
FIG. 4 is a timing diagram of repeatedly reading frame images from multiple buffer blocks according to a conventional technology.

The diagram shows a clock diagram of an operation under the input slow mode in the method for reading and writing frame images having variable frame rates, in which a write end writes the frame images to the buffer block according to a write timing 701, and a read end is preset to read the data from the buffer block according to a read timing 702. However, the input slow mode may cause the problem of frame tearing as shown in FIG. 2. Therefore, according to the diagram, a buffer-reading clock 703 is introduced to the system for controlling a timing of the read end so as to read the data from the buffer block along with the buffer-reading clock 703.

In an exemplary example, the read timing 702 indicates that the read end operates according to the vertical sync signals that are shown as the arrows in the diagram. However, for preventing the read end to read the location of the buffer block that is not yet written with the new data, the original vertical sync signal of the read end is modified (e.g., modified to be the vertical sync signals 704 and 705) according to the buffer-reading clock 703 if the writing progress of the write end does not reach the progress threshold. In other words, if the vertical sync signal is at a high signal level of the buffer-reading clock 70, the read end performs reading action normally; but if the vertical sync signal is at a low signal level of the buffer-reading clock 70, the reading action of the read end is suspended. Therefore, by suspending the reading action of the read end, the frame tearing problem can be avoided, and the refresh rate of the system can be increased.

Figure 8:
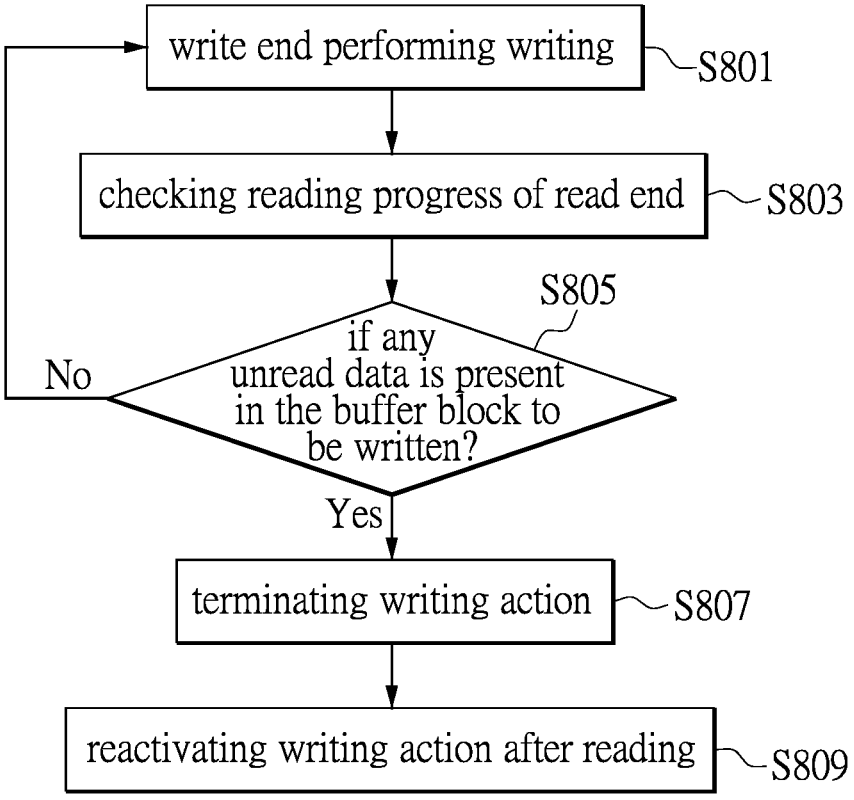
FIG. 8 is another flowchart illustrating the method for reading and writing frame images having variable frame rates according to a second embodiment of the present disclosure.

FIG. 8 is another flowchart of the method for reading and writing frame images having variable frame rates according to a second embodiment of the present disclosure. In the flowchart, through the vertical sync signals of the write end, the video-processing system controls the write end to perform a writing action (step S801). On the other hand, the vertical sync signals of the read end can be used to check a reading progress of the read end reading data from the buffer block (step S803). In the meantime, the video-processing system determines whether or not any data that is not yet read by the read end remains in the buffer block according to the vertical sync signals of the read end (step S805).

When the video-processing system determines that the unread data still remains in the buffer block (determined as "no"), the process goes on to perform the steps that begins from step S801. In the steps, it is determined whether or not the data written by the write end will overwrite the unread data that is not yet read by the read end in the buffer block. If it is determined that the unread data still remains in the buffer block according to the vertical sync signals of the read end (determined as "yes"), the writing action of the write end is terminated (step S807). The writing action will be re-activated if the read end finishes reading the data in the buffer block (step S809).

Figure 9:
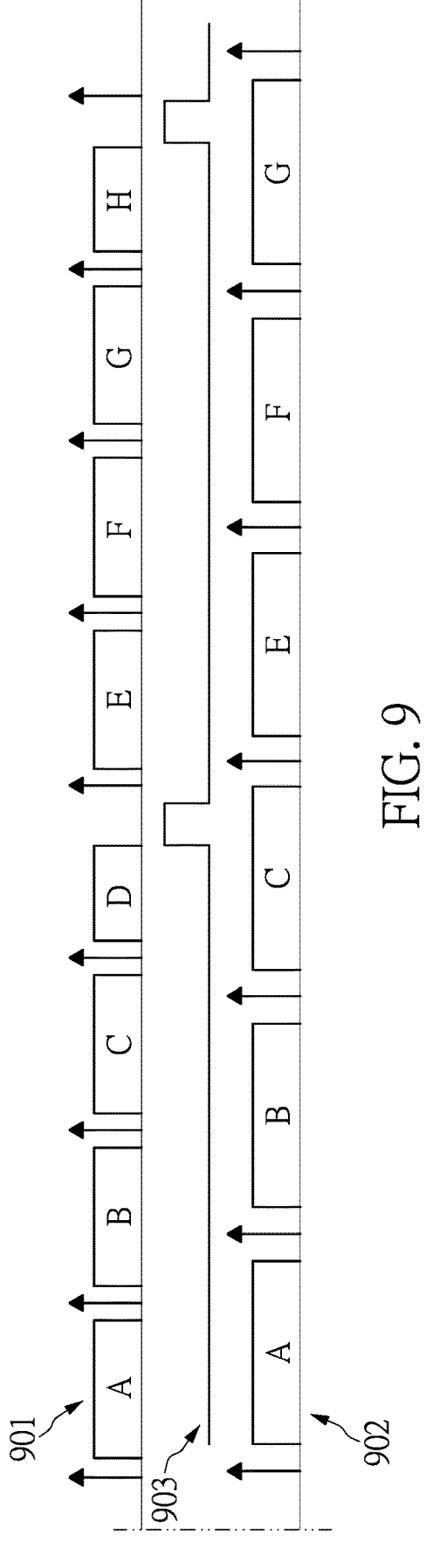
FIG. 9 is a timing diagram illustrating a write-mask clock in the method for reading and writing frame images having variable frame rates according to one embodiment of the present disclosure.

Reference is made to FIG. 9, which is a timing diagram of using a write-mask clock in the method for reading and writing frame images having variable frame rates according to one embodiment of the present disclosure, and can be used as a reference for a clock for controlling the writing action of the write end.

In the diagram, a write end writes frame images to a buffer block according to a write timing 901; at this time, a read end reads the frame images from the buffer block according to a read timing 902. Under an input fast mode, a write rate of the write end is higher than a read rate of the read end, so that the data in the buffer block may be overwritten by a new data even though the read end does not finish reading the data from the buffer block. Therefore, a write-mask clock 903 is introduced to the reading and writing processes of the system. The main objective of the write-mask clock 903 is to control a writing action of the write end. As shown in the figures, when the write-mask clock 903 is at a low signal level, the writing action will not be changed. However, when the write-mask clock 903 is at a high signal level, the writing action will be terminated. The writing action of the write end can be re-activated when the read end finishes reading the data from the buffer block.

Figure 10:
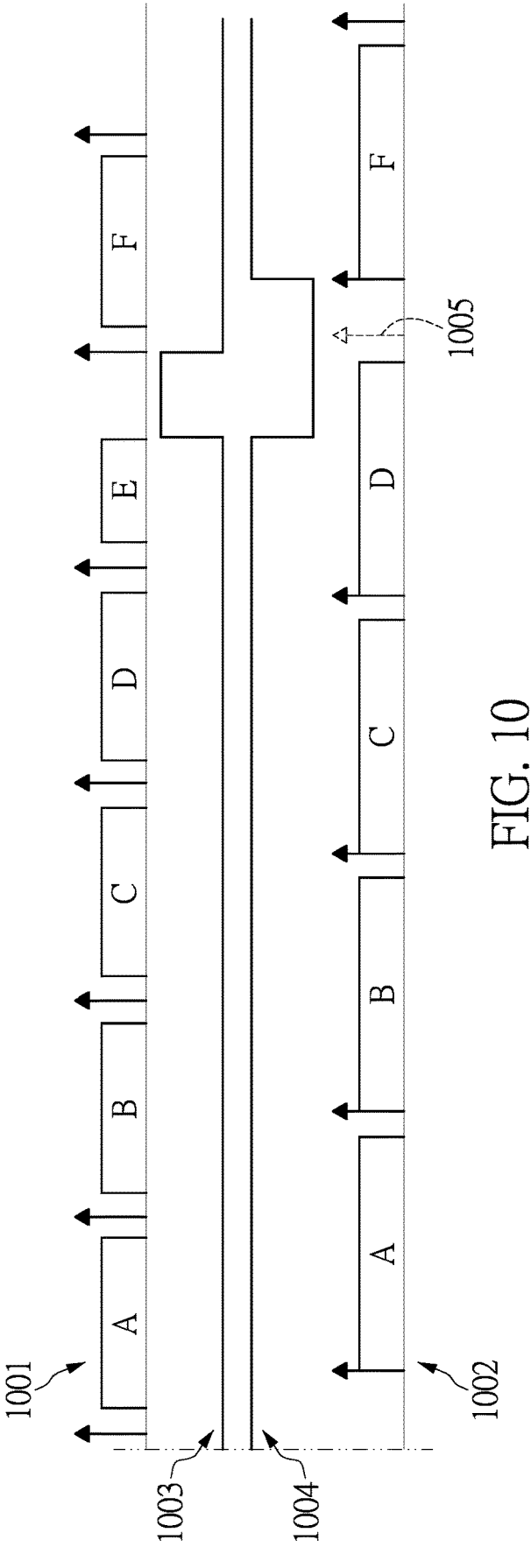
FIG. 10 is a timing diagram of the method for reading and writing frame images having variable frame rates according one embodiment of the present disclosure in operation.

FIG. 10 is a timing diagram showing a combined usage of the buffer-reading clock and the write-mask clock according to one embodiment of the present disclosure. The timing diagram shows a writing timing 1001 of a write end and a reading timing 1002 of a read end. Similarly, a write-make clock 1003 used to control a writing action of the write end and a buffer-reading clock 1004 used to control a reading timing of the read end are introduced.

As shown in the diagram, the video-processing system determines that the write end will write data to the location of the buffer block having data such as the frame image E that is not yet read by the read end. Based on a masking effect provided by the write-mask clock 1003, when writing the frame image E, the writing action of the write end can be terminated until the read end finishes reading a current frame image D. After the read end finishes reading the current frame image D from the buffer block, the write end goes on writing the frame image E to the buffer block.

In another scenario, when the read end finishes reading the frame image D and goes on reading a next frame image, e.g., the frame image E, a reading timing of the read end can be suspended according to the buffer-reading clock 1004 if it is determined that the write end does not finish writing data to the buffer block. For example, according to the buffer-reading clock 1004, the read end is re-activated to read the data from the buffer block after a vertical sync signal 1005 as shown in the diagram is suspended to a next vertical sync signal. As the present example shows, through the abovementioned embodiments of the method of the present disclosure, the read end may also skip one of the frame images.

It should be noted that the abovementioned first control mode can be adapted to an application having multiple buffer blocks. If the video-processing system is required to output a video with a special format, e.g., a frame is required to be outputted repeatedly, the read end will be required to continuously read multiple data from the buffer blocks. To prevent the read end from reading the data that is not yet updated by the write end, a control mechanism is provided that uses the abovementioned buffer-reading clock to ensure that the read end correctly reads the data from the buffer block. Therefore, the repeated-outputted frame images can be prevented from being different from one another.

In conclusion, according the abovementioned embodiments of the method and the system for reading and writing frame images having variable frame rates, the system requires the frame rate control (FRC) since an input rate is different from an output rate, and the system that when uses a single buffer block also meets the problem of decreased refresh rate or frame tearing due to having variable frame rates. The main technical concept of the method is to control a read end to start to read data from the buffer block after waiting for a write end to reach a specific writing progress. On the other hand, the writing action of the write end is terminated when determining that the unread data will be overwritten by the data written by the write end. Accordingly, the abovementioned problems can be effective avoided and the user experience when viewing videos can be improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and having various modifications as are suited to the particular use contemplated. Alternative embodiments will become apparent to those skilled in the art to which the present disclosure pertains without departing from its spirit and scope.

What is claimed is:

1. A method for reading and writing frame images having variable frame rates, and the method being adapted to a video-processing system that includes a write end and a read end for accessing a buffer block, wherein the method comprises:

controlling, when the read end is configured to read the frame images in the buffer block, the read end to start reading the frame images from the buffer block if data written by the write end to the buffer block reaches a progress threshold; and terminating a writing action of the write end when an unread portion of the read end is determined to be overwritten by the data written by the write end, until the read end finishes reading the frame images.

2. The method according to claim 1, wherein, when the write end writes the frame images to the buffer block, a control circuit or control software in the video-processing system determines a writing progress of the write end writing the frame images to the buffer block; wherein, if the writing progress of the write end reaches the progress threshold, the read end is notified to start reading the frame images in the buffer block.

3. The method according to claim 2, wherein the video-processing system determines the writing progress of the write end writing the frame images according to a vertical sync signal of the write end.

4. The method according to claim 3, wherein a buffer-reading clock is introduced, and when the writing progress of the write end does not reach the progress threshold, the read end relies on the buffer-reading clock to modify an original vertical sync signal of the read end so as to suspend a reading action of the read end.

5. The method according to claim 1, wherein, when the write end is configured to write the frame images to the buffer block, if a control circuit or control software in the video-processing system determines that the buffer block to be written with a new frame image by the write end stores unread data of the read end, the write end is controlled to terminate writing the frame images.

6. The method according to claim 5, wherein the video-processing system determines whether or not the buffer block includes the unread data of the read end according to a vertical sync signal of the read end.

7. The method according to claim 6, wherein a write-mask clock is introduced, and when the read end is yet to finish reading the frame images from the buffer block, the write-mask clock is applied for terminating the writing action of the write end.

8. A system that executes a method for reading and writing frame images having variable frame rates, comprising:

a video-processing system including a write end and a read end that are used to access one single buffer block, wherein the method comprises:

controlling, when the read end is configured to read the frame images in the buffer block, the read end to start reading the frame images from the buffer block if data written by the write end to the buffer block reaches a progress threshold; and terminating a writing action of the write end when an unread portion of the read end is determined to be overwritten by the data written by the write end, until the read end finishes reading the frame images.

9. The system according to claim 8, wherein, in the video-processing system, the write end and the read end are implemented by a circuit or software, and the write end and the read end are respectively connected with a memory that is used to implement the single buffer block.

10. The system according to claim 9, wherein the video-processing system includes a frame rate controller that is used to control each of the frame images of a video to be written to the single buffer block and to be read from the single buffer block, and the frame rate controller is used to execute frame rate conversion.

11. The system according to claim 8, wherein, in the method for reading and writing frame images having variable frame rates, when the write end writes the frame images to the buffer block, a control circuit or control software in the video-processing system determines a writing progress of the write end writing the frame images to the buffer block; wherein, if the writing progress of the write end reaches the progress threshold, the read end is notified to start reading the frame images in the buffer block.

12. The system according to claim 11, wherein the video-processing system determines the writing progress of the write end writing the frame images according to a vertical sync signal of the write end.

13. The system according to claim 12, wherein, a buffer-reading clock is introduced, and when the writing progress of the write end does not reach the progress threshold, the read end relies on the buffer-reading clock to modify an original vertical sync signal of the read end so as to suspend a reading action of the read end.

14. The system according to claim 8, wherein, in the method for reading and writing frame images having variable frame rates, a control circuit or control software of the video-processing system determines that the buffer block to be written with a new frame image by the write end stores unread data of the read end, the write end is controlled to terminate writing the new frame images.

15. The system according to claim 14, wherein the video-processing system determines whether or not the buffer block include the unread data of the read end according to a vertical sync signal of the read end.

16. The system according to claim 15, wherein, a write-mask clock is introduced, and when the read end is yet to finish reading the frame images from the buffer block, the write-mask clock is applied for terminating the writing action of the write end.

* * * * *